United States Patent [19]
Hubble, III et al.

[11] Patent Number: 5,451,778
[45] Date of Patent: Sep. 19, 1995

[54] APPARATUS AND METHOD FOR BEAM STEERING IN A RASTER OUTPUT SCANNER

[75] Inventors: Fred F. Hubble, III; James P. Martin, both of Rochester; Edward A. Powers, Penfield; Kenneth R. Ossman, Macedon, all of N.Y.

[73] Assignee: Xerox Corporation, Stamford, Conn.

[21] Appl. No.: 295,579

[22] Filed: Aug. 25, 1994

Related U.S. Application Data

[62] Division of Ser. No. 932,525, Aug. 20, 1992, Pat. No. 5,386,123.

[51] Int. Cl.6 .................. G01N 21/86; H01J 40/14
[52] U.S. Cl. .................. 250/234; 250/559.29; 250/214.1
[58] Field of Search .................. 250/234–236, 250/561, 201.6, 214.1, 559.29; 358/88, 443

[56]            References Cited
            U.S. PATENT DOCUMENTS

| | | | |
|---|---|---|---|
| 4,349,847 | 9/1982 | Traino | 358/293 |
| 4,370,047 | 1/1983 | Damouth et al. | 355/3 |
| 4,518,855 | 5/1985 | Malak | 250/201 |
| 4,644,406 | 2/1987 | Nishigaki et al. | 358/213 |
| 4,791,452 | 12/1988 | Kasai et al. | 355/14 D |
| 4,827,120 | 5/1989 | Stauffer | 250/227 |
| 4,923,303 | 5/1990 | Lutz | 356/375 |
| 4,926,050 | 5/1990 | Shemwell | 250/560 |
| 4,981,354 | 1/1991 | DeHainaut et al. | 356/141 |
| 4,987,293 | 1/1991 | Baciak | 250/206.1 |
| 5,006,705 | 4/1991 | Saito et al. | 250/235 |
| 5,043,564 | 8/1991 | Ikuta | 250/201.4 |
| 5,043,744 | 8/1991 | Fantuzzo et al. | 346/108 |
| 5,105,077 | 4/1992 | Asada | 250/205 |
| 5,107,449 | 4/1992 | Ikuta | 364/561 |
| 5,109,276 | 4/1993 | Nudelman et al. | 358/88 |
| 5,148,011 | 9/1992 | Taka | 250/201.6 |
| 5,200,838 | 4/1993 | Nudelman et al. | 358/443 |
| 5,204,714 | 4/1993 | Nonaka et al. | 354/403 |
| 5,208,796 | 5/1993 | Wong et al. | 369/97 |

FOREIGN PATENT DOCUMENTS

| | | | |
|---|---|---|---|
| 0075628 | 4/1983 | European Pat. Off. | G02B 27/17 |
| 0263774 | 4/1988 | European Pat. Off. | G02B 26/10 |
| 0419226 | 3/1991 | European Pat. Off. | G06K 7/10 |
| 0420198 | 4/1991 | European Pat. Off. | H04N 1/04 |
| 0433910 | 6/1991 | European Pat. Off. | B65H 23/04 |
| 0494105 | 7/1992 | European Pat. Off. | G03G 15/00 |
| 3503048 | 8/1985 | Germany | H01L 27/14 |

OTHER PUBLICATIONS

Hull et al., "Printer Motion Compensation," Xerox Disclosure Journal, vol. 14, No. 2, Mar./Apr. 1989, p. 85.
Kelly, Brian O., "Lateral-Effect Photodiodes," Laser Focus, Mar. 1976, pp. 38–40.
S. Holly, "Lateral Interferometry Monitors Fiber Diameter," Laser Focus, Mar. 1976, pp. 58–60.

*Primary Examiner*—Stephone B. Allen
*Attorney, Agent, or Firm*—Duane C. Basch

[57]            ABSTRACT

An apparatus and method for reliably monitoring the position of a radiant energy beam, for example, a scanning laser beam such as that produced by a raster output scanning system to expose a photoresponsive member, where the beam traverses the surface of a photoreceptive member at a high rate of speed. The apparatus, which includes a lateral-effect photodiode, is also capable of signaling when the radiant energy beam traverses a specific location. The apparatus may also be used to determine the relative intensity of the radiant energy beam, thereby significantly reducing the space and expense necessary to monitor the radiant energy beam by combining multiple sensing operation in a single apparatus.

4 Claims, 8 Drawing Sheets

APPARATUS AND METHOD FOR BEAM STEERING IN A RASTER OUTPUT SCANNER

This is a division of application Ser. No. 07/932,525, filed Aug. 20, 1992, now U.S. Pat. No. 5,386,123.

This invention relates generally to monitoring the position of a radiant energy beam, and more particularly to the use of a lateral-effect photodiode to monitor the position of a laser beam within an image scanning apparatus.

BACKGROUND AND SUMMARY OF THE INVENTION

In order to increase the throughput of printers producing multilayer images, single-pass, multiple exposure systems have been developed. A variety of methods are known for creating multiple Raster Output Scanner (ROS) single-pass color printer architectures. A desirable configuration, because of the high throughput achievable, is the tandem system where multiple exposures are simultaneously produced on separate photoreceptors. For example, U.S. Pat. No. 4,370,047 to Damouth et al. discloses, in FIG. 4, a tandem architecture utilizing four scanning systems with a single polygon scanner.

It is also common in single-pass ROS systems to utilize a single photoreceptor whereby a plurality of primary color images may be developed sequentially or on top of one another, to achieve a color image which is transferable to an output medium or copy sheet in a conventional manner. For example, U.S. Pat. No. 4,791,452 to Kasai et al. illustrates such a printing system.

Common to all of these systems is the need to accurately monitor and control the exposure source, for example, a radiant energy beam or laser, which is used to selectively expose regions of the photoreceptor, with respect to the photoreceptor motion. For example, U.S. Pat. No. 4,349,847 to Traino and "Printer Motion Compensation" by Hull et al., published in the Xerox Disclosure Journal, Vol. 14, No. 2, p. 85, illustrate methods by which the exposure of an image raster is controlled with respect to the photoreceptor. Furthermore, the registration of sequential color images, in both the fast-scan direction (direction of the traversing laser beam) and the slow-scan direction (process direction of the photoreceptor), relies on the control of the ROS motion with increasing accuracy as color rendition requirements become more stringent for color printers.

Heretofore, various techniques have been employed to monitor or adjust the location of laser beams, including those used in raster input scanners (RISs) and ROSs. Some of the approaches used are illustrated in the following disclosures which may be relevant:

"Lateral-Effect Photodiodes" by Kelly, published in Laser Focus, March 1976, discloses the use of lateral-effect photodiodes for determination of the displacement of a light spot which impinges on the active area of the photodiode. As described in the technical disclosure, a typical circuit utilizes a differential amplifier and a summing amplifier to determine the light spot position. Also noted are the major disadvantages of the lateral-effect detector, that of slow speed and high noise.

U.S. Pat. No. 4,518,855 Patentee: Malak Issued: May 21, 1985

U.S. Pat. No. 4,827,120 Patentee: Stauffer Issued: May 2, 1989

U.S. Pat. No. 4,926,050 Patentee: Shemwell Issued: May 15, 1990

U.S. Pat. No. 4,981,354 Patentee: DeHainaut et al. Issued: Jan. 1, 1991

U.S. Pat. No. 4,987,293 Patentee: Baciak Issued: Jan 22, 1991

U.S. Pat. No. 5,043,744 Patentee: Fantuzzo et al. Issued: Aug. 27, 1991

The relevant portions of the foregoing patents may be briefly summarized as follows;

U.S. Pat. No. 4,518,855 by Malak discloses a method and apparatus for checking and monitoring the linear alignment of two shafts where one shaft is the reference shaft and the other is aligned thereto. Generally, a pair of dual-axis (x-y) detectors and associated radiation beams are mounted with respect to the shafts to be aligned. Signals produced by the detectors are used by a readout means to indicate when the defined alignment condition has been achieved.

U.S. Pat. No. 4,827,120 by Stauffer discloses an elongated, cylindrical shaped element having an exposure window along the length of the cylinder. Light entering the cylinder, via the exposure window, is diffused towards the ends thereof where photodiodes are used to produce electrical signals in response to the light. The light impinging on the photodiodes, and therefore the output signals of the photodiodes, is proportional to the location at which the light enters the cylinder along the length of the exposure window.

U.S. Pat. No. 4,926,050 by Shemwell discloses a distance measuring system having a receiver which employs a pair of spaced apart, lateral effect cells which produce signals in response to a laser beam traversing the surface of the cells. The transmitter repeatedly swings a well defined beam across an arc which covers the location of the receiver, whereby the angular velocity of the beam is a constant. Hence, measurement of the amount of time required for the beam to traverse the distance between the cells allows the determination of the distance between the transmitter and the receiver.

U.S. Pat. No. 4,981,354 by DeHainaut et al. discloses a differential tilt sensor intended for use with a phased array telescope. A two-dimensional lateral effect cell is used to measure the centroid locations of a pair of chopped beams, the output of the cell being subsequently differentiated to produce both x and y analog tilt output signals.

U.S. Pat. No. 4,987,293 by Baciak discloses a digital position monitor which is used to output the x and y position of a laser beam impinging upon a lateral effect detector, the x and y positions being used to control a phased array telescope. The two-channel system (x, y) comprise an analog-to-digital converter, a microprocessor, and a digital-to-analog converter connected in series to provide the x and y outputs. The position of the laser beam output by the laser telescope is constantly monitored to enable the control thereof, and to effectuate the steering of a synthetic array of multiple telescopes.

U.S. Pat. No. 5,043,744 by Fantuzzo et al. discloses a raster output scanner (ROS) in which a movable scanning element scans a high intensity beam across a movable imaging element to record images thereon. The movement of the imaging member and the tilt of the high intensity beam are controlled with respect to one another in order to produce a multi-color electrophotographic image which is transferred to a copy sheet. Timing marks, located in the marginal region of the photoreceptor, are used to provide the basic synchronization between the high intensity ROS beam and the movement of the photoreceptor, based upon pulses produced in response to the reflection, or non-reflection of the high intensity beam.

In accordance with the present invention, an apparatus is provided for sensing the position of a radiant energy beam in a first direction, the apparatus includes a lateral-effect photodiode having at least two electrodes spaced in opposition to one another so as to produce electrical signals in response to the radiant energy beam impinging upon an active region of the photodiode. In addition, the electrodes each have integrating means to integrate the electrical signal produced during a portion of the period in which the radiant energy beam impinges upon the photodiode, the output of the integrating means being subsequently passed to differentiating means. The differentiating means determines the position of the radiant energy beam as a function of the difference between the integrated electrical signals.

In accordance with an additional aspect of the present invention, there is provided an apparatus suitable for sensing the position of a radiant energy beam traversing a surface of the apparatus in a first direction, and for indicating the time at which the beam traverses a locus defined therein. The apparatus includes a lateral-effect photodiode having a first pair of electrodes, spaced apart from one another, for producing electrical currents in response to carriers of a first polarity produced by the radiant energy beam impinging upon an active photodiode region lying between the first pair of electrodes. The lateral-effect photodiode also includes a second pair of electrodes, spaced apart from the first electrode pair, which are adjacent and parallel to one another, extending the length of the active photodiode region. The second pair of electrodes also output electrical signals in response to carriers of a second polarity produced by the radiant energy beam impinging upon the active photodiode region which at least partially covers the second electrode pair.

In accordance with another aspect of the present invention, an imaging apparatus is provided for forming, during a single pass, multiple image exposure frames on a photoconductive member moving in a process direction. Included is a Raster Output Scanner (ROS) unit for generating image-modulated scan lines, or rasters, which are transmitted along an optical path to an associated image exposure frame. The ROS unit includes a laser, means for modulating the intensity of the laser beam in response to input video signals, and optics for directing the laser beam onto the associated image exposure frame of the photoconductive member to provide an optically focused scan line at the photoreceptor surface. Also included in the imaging system is a sensing element for sensing the position of the laser scan line with respect to the process direction and for producing a signal as a function of the scan line position. In addition, a beam steering mechanism, responsive to the signal produced by the sensing element, is provided for altering the position of the scan line to enable steering of the scan line in the process direction.

In accordance with yet another aspect of the present invention, there is provided a method for forming multiple image exposure frames on a photoconductive member moving in a process direction during a single pass. The method begins with the step of generating an image-modulated scan line with the ROS beam. Next, the position of the beam is monitored by a sensing circuit which employs a lateral-effect photodiode having at least two opposing electrodes. The current generated in the photodiode electrodes is integrated during a period in which the beam impinges upon the active region of the photodiode. Subsequently, the position of the scan line is determined as a function of the ratio between a sum and a difference signal determined from the integrated signals. The ratio is then used by a steering mechanism to adjust the transit path of the scan line at the photoreceptor in response to the ratio.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims. Specifically, the present invention is not intended to be limited to ROS embodiments alone, rather, it is fully intended to be suitable for monitoring radiant energy beams associated with raster input scanning systems as well.

DESCRIPTION OF THE PREFERRED EMBODIMENT

Figure 1:
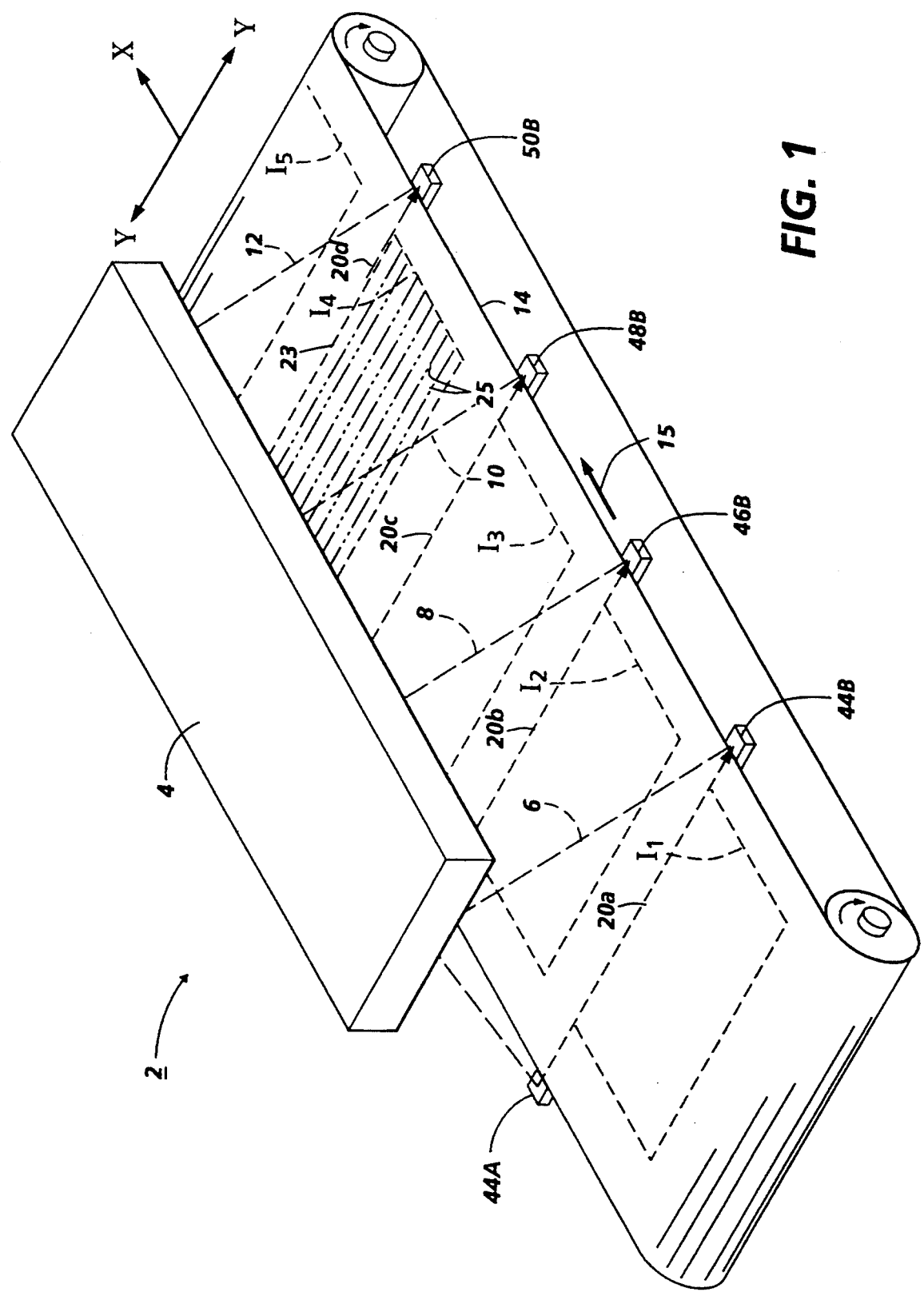
FIG. 1 shows a single-pass ROS color printing system with a housing incorporating four ROS systems.

For a general understanding of the present invention, FIG. 1 shows a single-pass ROS color printing system 2, which includes a ROS housing 4. System 2 produces four separate output scanning beams, 6, 8, 10, and 12. System 2 further includes a photoreceptor belt 14, driven in the process direction, indicated by the arrow 15. The length of belt 14 is designed to accept an integral number of spaced image areas $I_1$–$I_n$ represented by dashed line rectangles in FIG. 1. Upstream of each exposure station are charge devices (not shown) which place a predetermined electrical charge on the surface of belt 14. As the belt moves in the indicated direction, each image area is scanned by a succession of scan lines to provide an image exposure pattern in response to image data signals which are input to the respective ROSs. The exposure pattern begins when the leading edge of image area 23 reaches a transverse start-of-scan line represented by dashed arrows 20a, 20b, 20c, and 20d. The exposure pattern is formed of a plurality of closely spaced transverse scan lines 25 shown with exaggerated longitudinal spacing on image area $I_4$. Downstream from each exposure station, development systems device latent image of the last exposure without disturbing previously developed images. A fully developed color image is then transferred by means not shown to an output sheet. System 2 is a full color printer, although highlight color may be similarly provided by enabling two or more of the ROS systems. Further details of the operation of xerographic stations in a multiple exposure, single-pass system are disclosed in U.S. Pat. No. 4,660,059 to O'Brien and U.S. Pat. No. 4,791,452 to Kasai et al., the relevant portions of which are hereby incorporated by reference.

With a system such as that disclosed in FIG. 1, each color image $I_1$–$I_5$ must be precisely aligned so that all corresponding pixels in the image area are registered in the transverse and process directions. Potentially, system registration tolerances of approximately 35 microns may be required. Moreover, the required alignment must be maintained through continuous revolutions (passes) of the photoreceptor.

Figure 2:
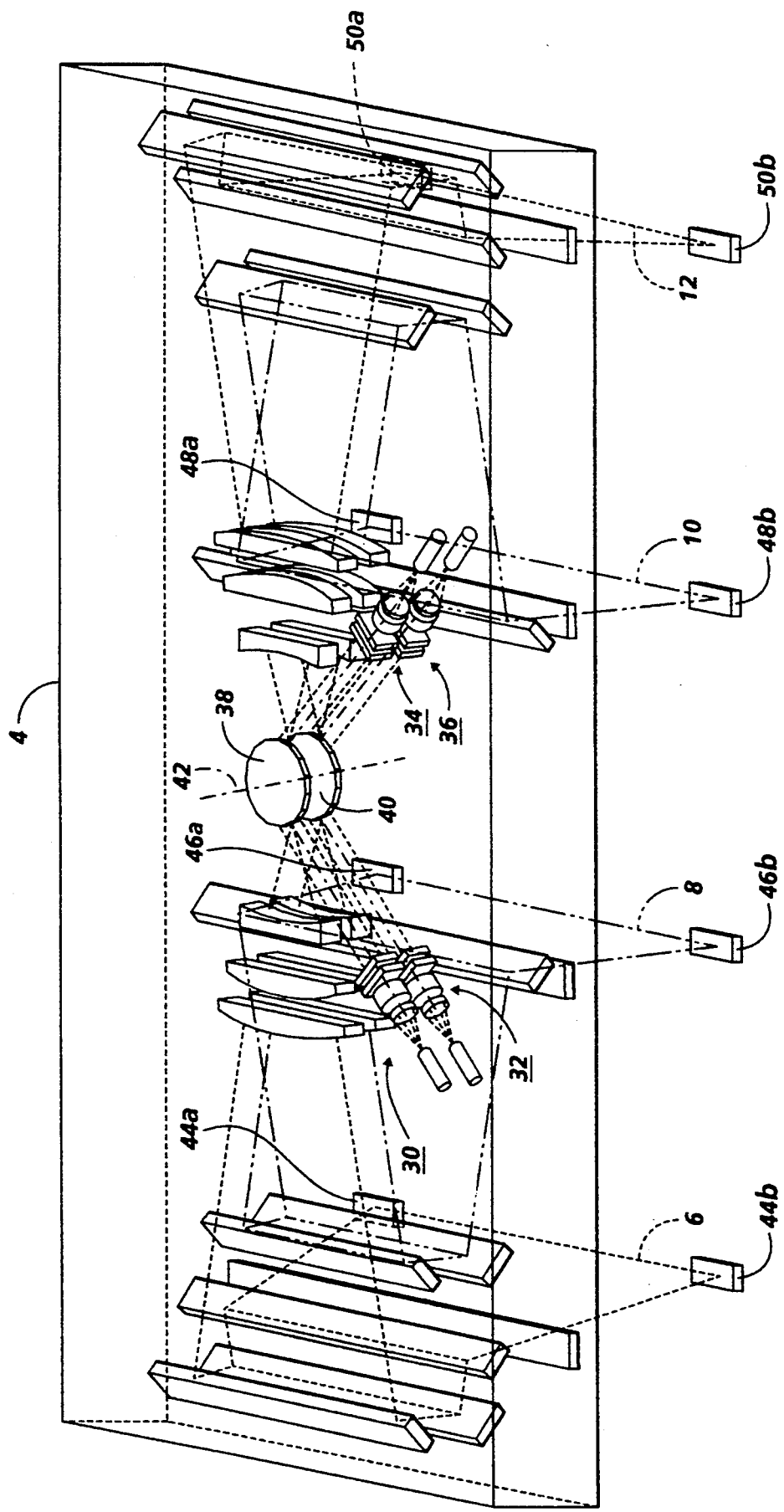
FIG. 2 shows a perspective view of the interior of the ROS housing showing the alignment of four ROS optical systems about a dual polygon optical shaft.

Turning now to FIG. 2, in one embodiment of the present invention, ROS housing 4 comprises four optical systems, 30, 32, 34, and 36, which are symmetrically arranged around two polygons, 38 and 40, which are rotated on a common spindle shaft 42, driven by a motor (not shown). The optical systems, 30, 32, 34, and 36 are arranged so as to produce modulated scanning beams 6, 8, 10, and 12, respectively, each beam being associated with a different color image. For example, the modulated beams may be produced by a solid state laser, whereby the current supplied to the laser is used to control or modulate the intensity of the beam. The beams are projected through apertures in the housing (not shown), and onto photoreceptor 14 as pulsed beams. Further description of the ROS optical system is found in U.S. patent application Ser. No. 07/825,463 by Hinton et al. (Filed Jan. 24, 1992), the relevant portions of which are hereby incorporated by reference.

Also depicted in FIGS. 1 and 2 are pairs of beam steering sensor heads, 44a,b, 46a,b, 48a,b, and 50a,b, each pair used to sense the location of scan lines 6, 8, 10, and 12, respectively, as they traverse the surface of the photoreceptor. The sensor heads are used to sense the beam skew, as well as, the process direction position relative to one of the beams selected to serve as a datum. Sensor heads 44a, 46a, 48a, and 50a could also be used as start-of-scan (SOS) sensors and would thus be used for a dual purpose. The first is that of sensing the location of the laser beam in the process, or X, direction as it traverses the scan line. The second purpose served by the sensors is that of determining the time at which the laser beam traverses a specific point, the occurrence of this event being used to synchronize the start-of-scan locations for each of the individual color image frames, $I_1$–$I_5$, thereby registering the frames in the fast-scan, or Y, direction. While the beam steering sensor pairs are depicted as lying at the edges of photoreceptor belt 14, in an alternative embodiment the sensors may be placed beneath the belt, provided that the transmissivity of the belt is sufficiently high to allow the light beam to pass through it with sufficient intensity. In another embodiment, exposure of photoreceptor belt 14 may be achieved with a plurality of LED printbars in replacement of the multibeam ROS system, wherein the output and orientation of the printbars would be controlled in a manner similar to that used for the control of the ROS beams, again as a result of the signals produced by the beam steering sensors.

Figure 3:
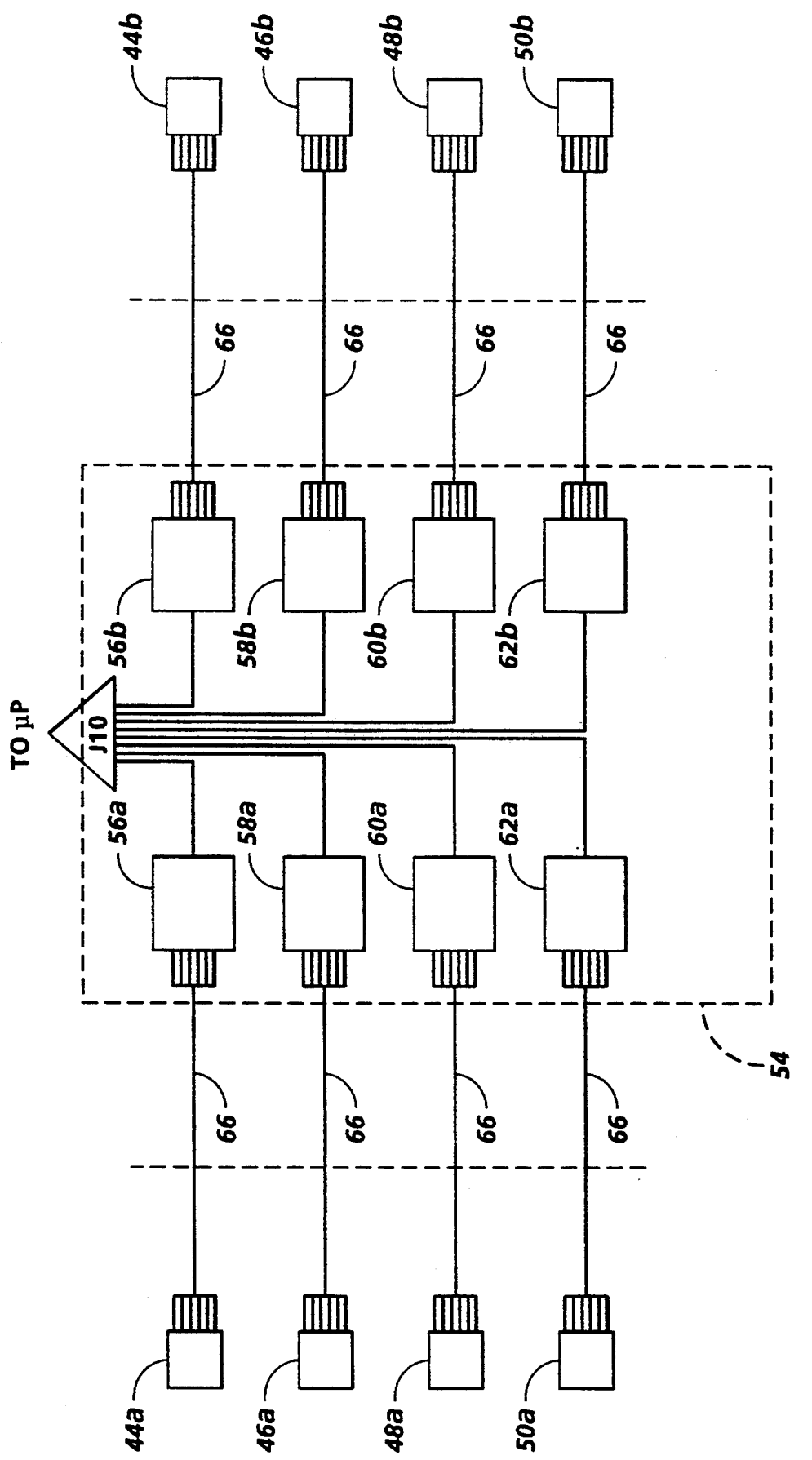
FIG. 3 is a block diagram illustrating the elements of the beam steering system for the four color ROS printing system of FIGS. 1 and 2.

Referring now to FIG. 3, which illustrates an electrical block diagram of the present invention, the beam steering sensor heads, 44a,b, 46a,b, 48a,b, and 50a,b, are individually connected to interface printed wiring board (PWB) 54. Interface PWB 54 contains additional electrical circuitry associated with each of the beam steering sensors in order to interface the sensors with a digital controller (not shown), such as a commonly available microprocessor ($\mu P$). More specifically, interface PWB 54 contains interface blocks 56a,b, 58a,b, 60a,b, and 62a,b, which are used to interface to the analog signals of sensor heads 44a,b, 46a,b, 48a,b, and 50a,b, respectively. Each of the beam steering sensors is connected to the interface PWB by a wiring harness, 66, which carries power to the sensors and returns the analog signals generated by the sensors to the respective interface block. Once the interface blocks process the signals from the beam steering sensors, the signals would subsequently be converted to a digital representation by an appropriate analog-to-digital (A/D) converter (not shown) before being passed to the microprocessor. Subsequently, the microprocessor would execute a control algorithm to determine if the beams had traversed the sensor at the desired location and, if not, the microprocessor would initiate a corrective adjustment of the ROS optics to alter the beam path. Examples of the corrective adjustments can be found in U.S. patent application Ser. No. 07/825,463 by Hinton et al. (Filed Jan. 24, 1992), previously incorporated herein by reference. Moreover, in the multiple beam embodiment the control algorithm would steer or adjust one or more of the beams with respect to a "fixed" beam identified as the datum.

Figure 4A:
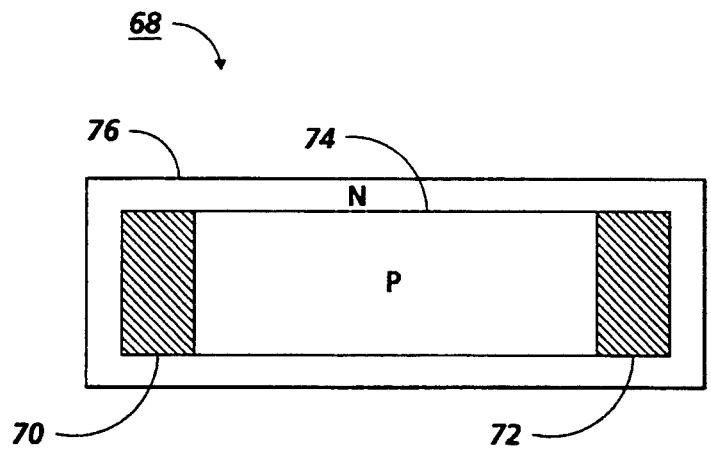
FIGS. 4A, 4B and 4C are detailed illustrations of the lateral effect photodiode of the present invention.
Figure 4B:
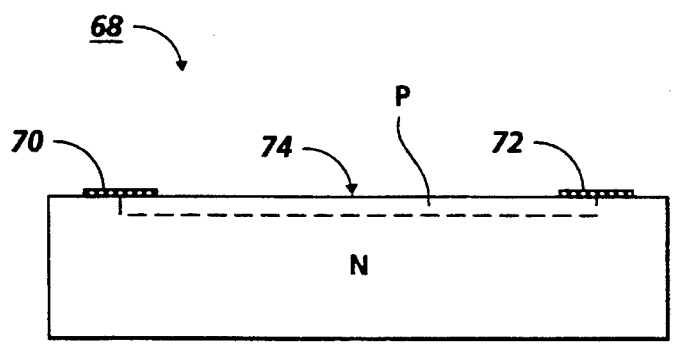
Figure 4C:
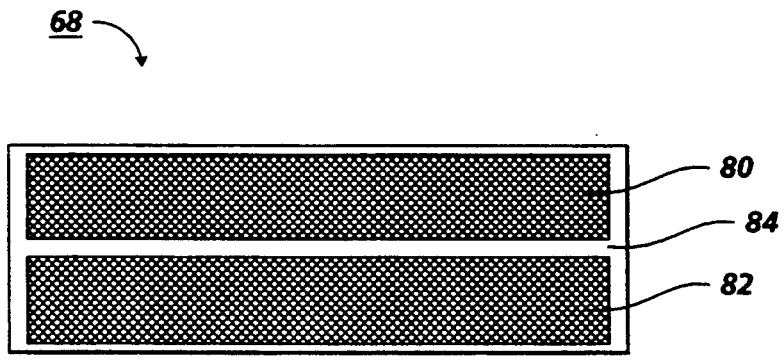

FIGS. 4A, 4B, and 4C are orthographic illustrations of the top, side and bottom views of a lateral-effect photodiode sensor, 68, which may be used in one embodiment of the present invention. Specifically, as illustrated by FIG. 4A, a pair of top electrodes, 70 and 72, are disposed on opposite ends of a P on N or an N on P photodiode 76, where P and N represent the dopant types within the active photodiode region, 74. For example, the photodiode could be a 3 millimeter by 1 millimeter single-axis lateral photodiode which is commercially available from United Detector Technology (UDT), referred to as a Very High Accuracy Single Axis Position Sensing Photodetector (Part no. PIN-SL3-2). Use of such a single-axis photodiode would, however, limit the embodiment to the sensing of the position of the ROS beam in only a single dimension.

In the alternative sensor embodiment, depicted in FIG. 4C, the bottom of photodiode region 74 may be metallized with a second pair of opposed electrodes, 80 and 82. The two bottom electrodes would function as a conventional split detector, where the photocurrent division is performed at the bottom of the diode in addition to the top. This alternative is achievable given the relatively deep penetration of the ROS beam into the photodiode silicon at the typical ROS beam wavelength of approximately 680–760 nanometers, and the signal is generated by carriers of opposite polarity from those which generate the signals at the top electrodes.

In operation, bottom electrodes 80 and 82 output approximately equivalent electrical signals whenever the beam impinges upon the surface of the photodiode at a location lying above slot 84, and unequal electrical signals whenever the beam impinges upon the photodiode surface lying on either side of the slot. Operation of such a split detector would further enable sensor 68 to generate signals from top electrodes 70 and 72, indicating the relative position of the transit path of the beam therebetween, and from bottom electrodes 80 and 82, signaling the time at which the beam traverses slot 84 by a change in the current levels output by electrodes 80 and 82. Essentially, the described embodiment would eliminate the need for separate start-of-scan sensors in sensor heads 44a, 46a, 48a, and 50a, and would allow a single detector to perform the functions of start-of-scan detection in the fast scan direction and beam position determination in the process direction.

Figure 5:
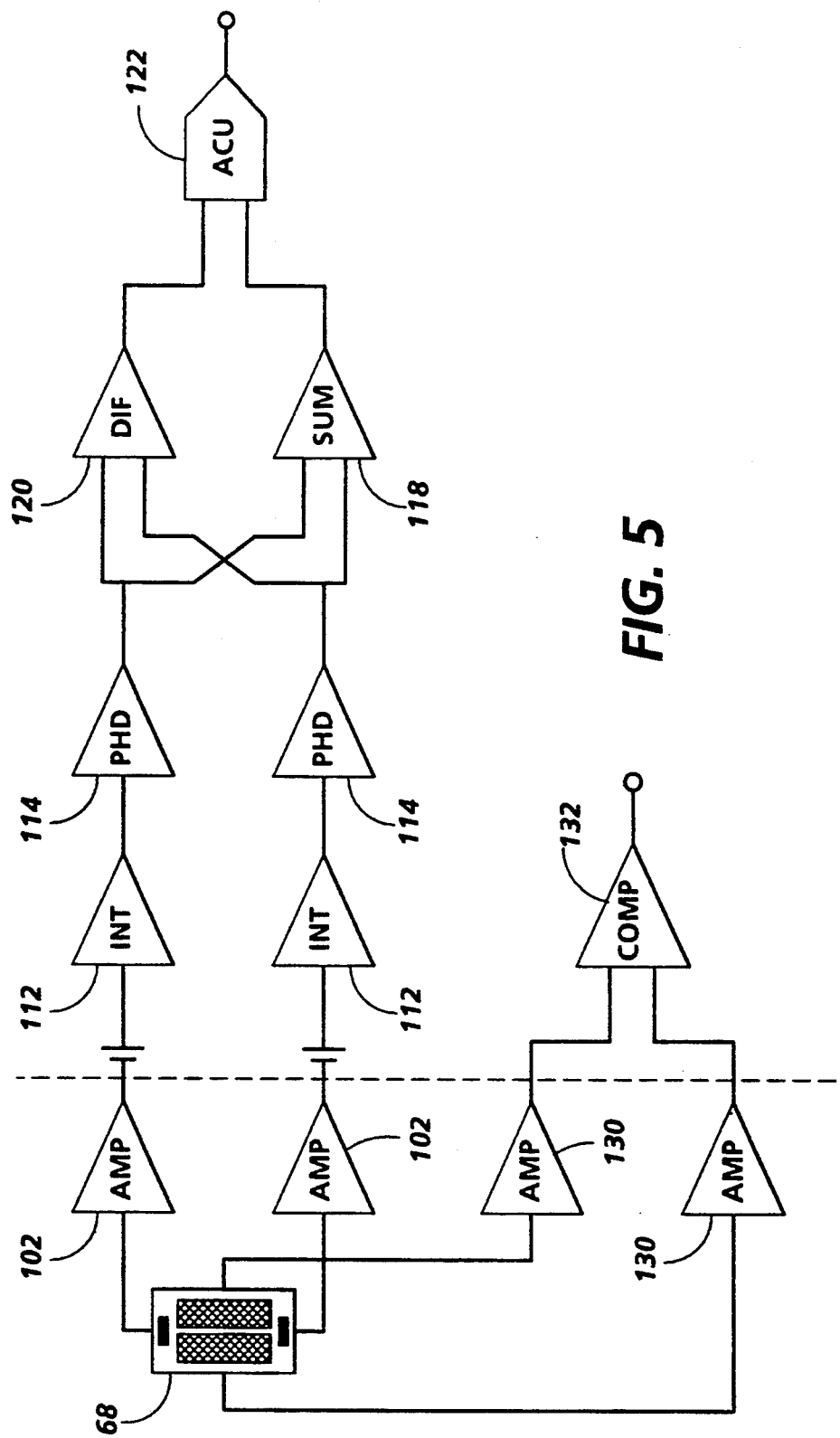
FIGS. 5, 6A and 6B are electrical schematics depicting the hardware associated with the lateral effect photodiode of FIG. 4.
Figure 6A:
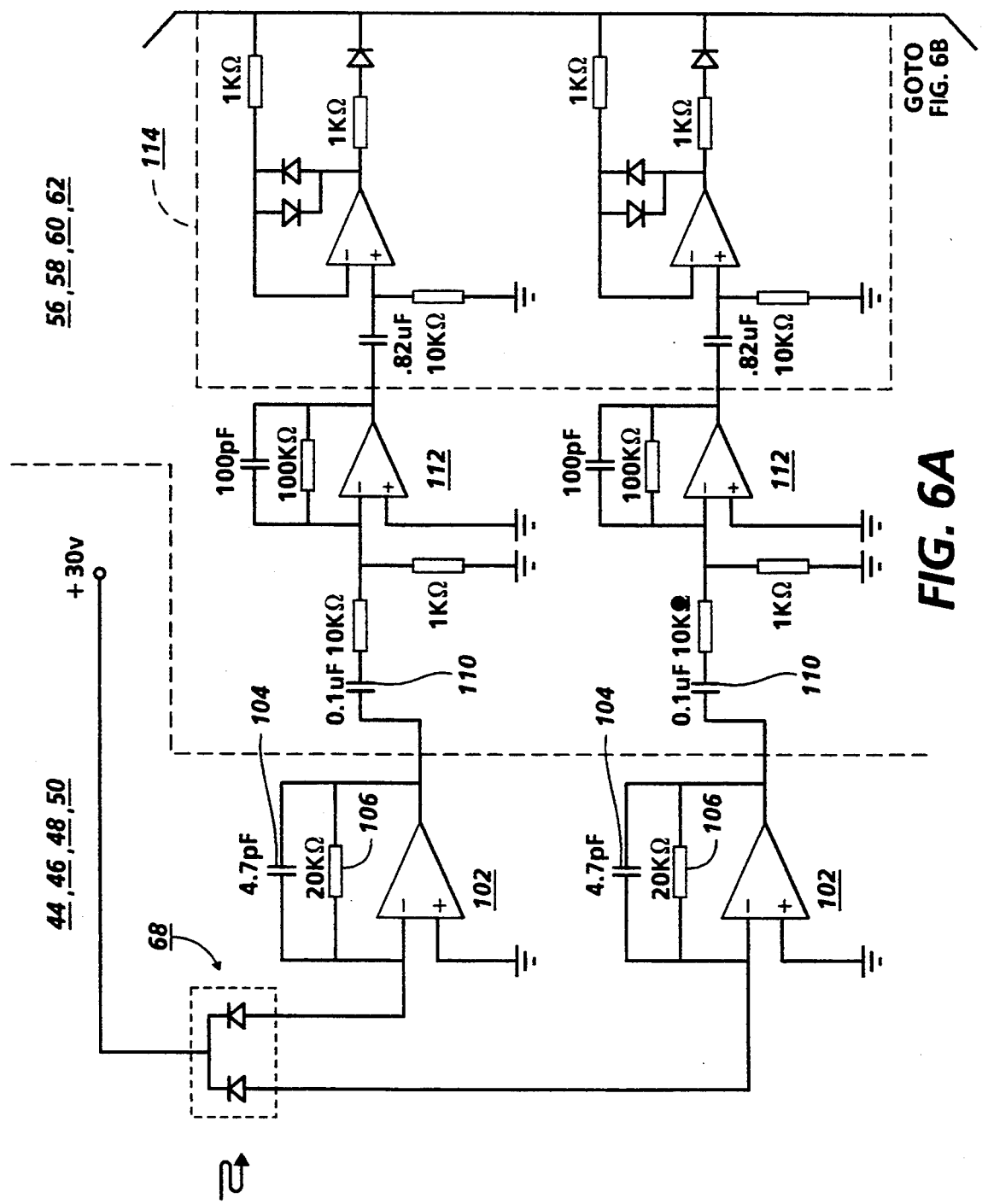
Figure 6B:
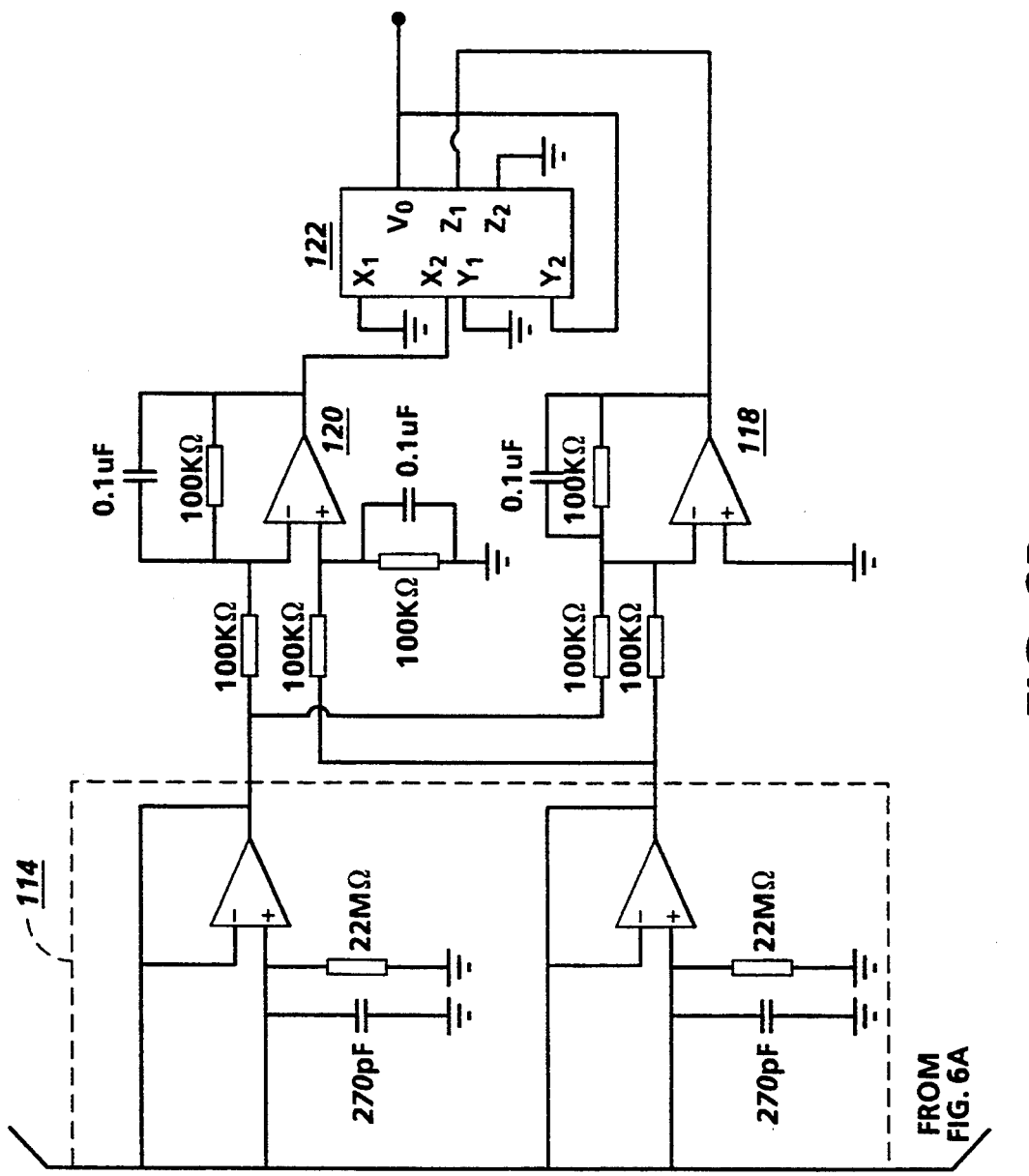

Referring now to FIGS. 5, 6A and 6B, which depict electrical schematics for a single sensor channel, lateral-effect photodiode sensor 68 is the basic element for each of the channels, including the the start-of-scan (a) and end-of-scan (b) positions. With respect to the position sensing operation of the photodiode, for which the circuitry is specifically illustrated in FIGS. 6A and 6B, electrodes 70 and 72 are both connected to amplifiers, 102, to amplify the signals prior to sending them over wiring harness 66 to interface PWB 54. As further illustrated in FIG. 6A, the amplifier is preferably an operational amplifier with a feedback loop consisting of a 4.7 pF capacitor, 104, and a 20KΩ resistor, 106, connected in parallel between the output of amplifier 102 and its inverting input. Also, photodiode 68 is reverse biased by applying approximately +30 volts to the cathode of the photodetector in order to improve both the carrier collection efficiency and the response time of the photodiode, although bias potentials between 5 volts and 40 volts would also result in suitable carrier collection at the electrodes. The present embodiment has divided the circuitry of each sensor channel into two physically separated components, where photodiode 68 and amplifier 102 are included in the sensor head and the remaining components are included on interface PWB 54. This embodiment is utilized to further reduce the size of the sensor head, thereby enabling it to fit into the constrained geometry surrounding photoreceptor belt 14. Alternatively, additional components of the channel may be included on the sensor head as space permits.

The signals produced by the photodiode electrodes are capacitively coupled, via capacitor 110 and low capacitance cables in wiring harness 66, to interface PWB 54, where integrators (INT) 112 integrate the signal and pass it to peak height detectors (PHD) 114. Use of integrators, 112, enables the use of the lateral-effect photodiode to sense the rapidly moving ROS beam as it briefly sweeps across the surface of the photodiode. Without the integrators, the brief pulse from the electrodes would only have a duration of approximately one or two microseconds, and would not be useful for determining the position of the beam sweep without highly responsive, and more expensive, components. Moreover, the integrators effectively minimize variance in the signal caused by attenuation of the beam due to dirt on the surface of the photodiode. By integrating the signals, aberrations in the electrode output caused by the attenuation of the beam intensity would have only minimal effect on the integrated signal, whereas it might significantly affect the output of the electrode for a brief period. Also, any attenuation would presumably affect both electrodes to the same degree and would therefore not impact the ratio of the two electrode signals. In addition, the use of the integrators significantly increases the signal-to-noise ratio (S/N) of the system, enabling the sensors to be used in the noisy environment of a printing system employing high-voltage xerographic charging and development subsystems. Similarly, the integrators permit the use of slower, less expensive, photodiodes as well.

The peak height detectors (PHDs), 114, have active feedback for high-speed operation and are employed in the circuit to capture the output from integrators 112. Subsequently, the output of PHDs 114 is used to drive the summing (SUM) and difference (DIF) amplifiers, 118 and 120, respectively. The output of summing amplifier 118 is a measure of the total flux applied to the diode by the incident ROS beam while the output of the difference amplifier 120 is a function of the difference in the number of carriers collected at each of the electrodes. The last component of the circuit is arithmetic computation unit (ACU) 122 which is configured to output a value that is ten times the ratio of the difference amplifier output divided by the summing amplifier output. Subsequently, the output of ACU 122 is converted using an analog-to-digital converter (not shown) and passed to a microprocessor where the signal is interpreted to determine whether a beam steering adjustment is necessary to bring the ROS beam into a proper position.

One advantage of the aforedescribed embodiment is the ability of the peak height detectors to hold the integrator outputs while the integrators decay to their zero point in preparation for the next flux intrusion, in response to the ROS beam's exposure of the next scan line. The use of the PHDs considerably smooths the output of ACU 122 and extends the time during which a valid signal may be read by the microprocessor. In operation, the circuit illustrated in FIG. 5B had an integrator decay time of about one-fifth of the anticipated scan line period, or approximately 750 microseconds. Also, the PHD decay was set to approximately fifty times the scan line period, which allowed the integrators to decay to within about 0.6% of the previous full-scale reading prior to the next beam sweep, while only allowing the PHDs to decay to about 98% of the previous full-scale reading during the same time period. It should be noted that the decay rates of the integrators and PHDs are controlled as a function of the time constants determined from the capacitor and resistor pairs associated with the devices. Effectively, the utilization of the PHDs, the integrators, and the large photodiode reverse bias, in combination, enables a slow photodiode, one that may not otherwise be sufficiently responsive to detect the fast moving ROS beam, to be used in detecting the position of the beam.

Figure 7:
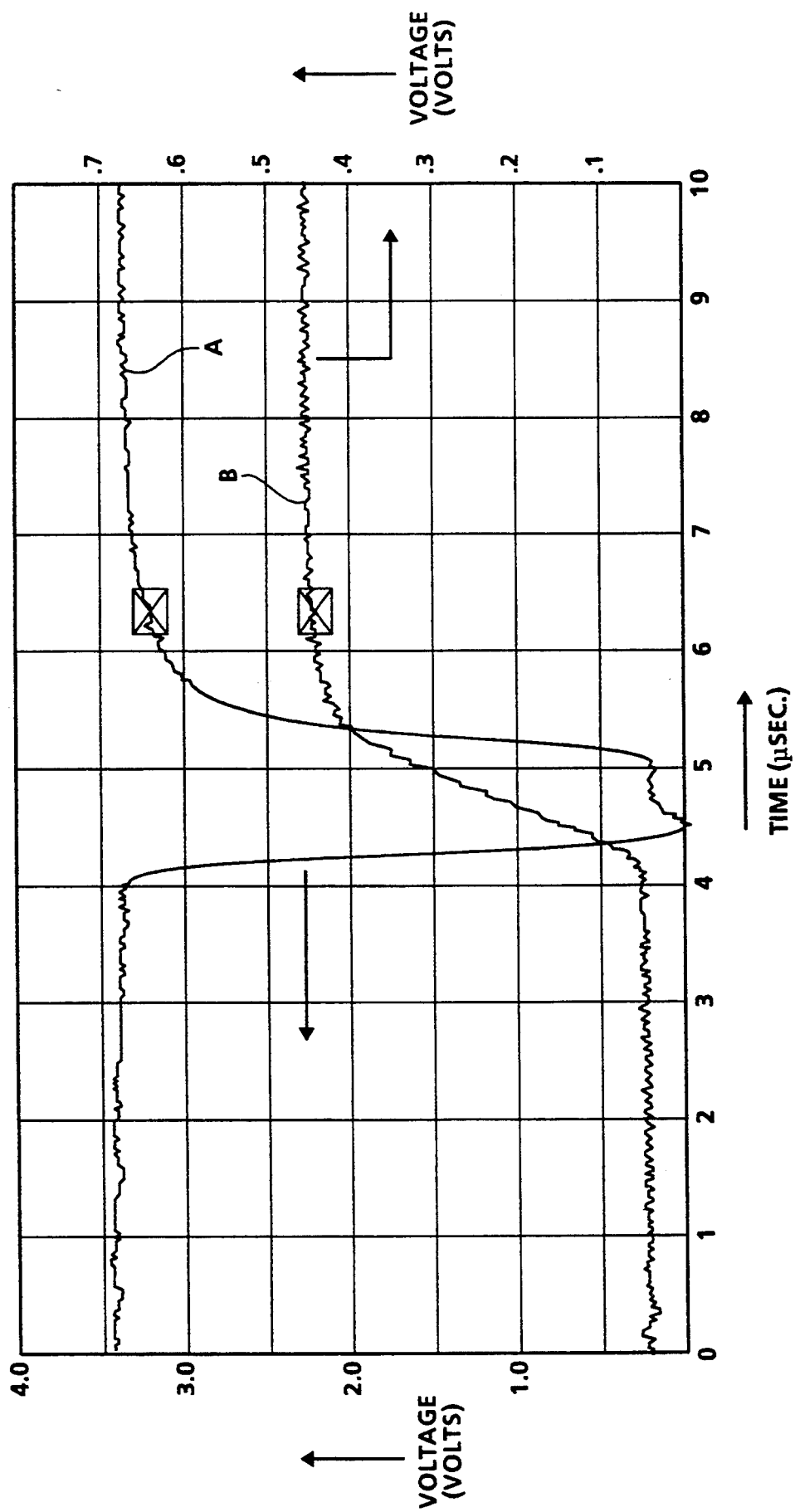
FIG. 7 is a graphical illustration of the typical signals output by a preamplifier and an integrator in a single-axis system during the transit of the ROS beam across the active surface of the photodiode.

FIG. 7 illustrates the typical signal outputs of the amplifier and integrator stages of the described embodiment. Trace A displays the output of amplifier 102 as the ROS beam traverses the lateral diode, where the approximate voltage level is displayed along the left side of the plot. Signal rise time is approximately 280 nanoseconds, and a small overshoot occurs at the lead edge due to a mismatch between the diode capacitance and the capacitance of amplifier compensation capacitor 104. Trailing edge decay time is approximately 720 nanoseconds with a two to three microsecond tail which is common for many photodiodes. Trace B shows the associated output of integrator 112, beginning with a zero level at the lead edge of the amplifier output pulse and rising to a full-scale value of approximately 0.43 volts, as indicated along the right side of the plot.

Also illustrated in the electrical block diagram of FIG. 5 is the circuitry associated with the split detector embodiment depicted in FIG. 4C, whereby photodiode 68 may also be used to detect the time at which the ROS beam traverses the small gap, or locus, between the parallel electrodes. Signals from electrodes 80 and 82 are passed to preamplifiers 130 where they are amplified to an extent which allows them to be passed across wiring harness 66 to interface PWB 54. Subsequently, the difference between the signals is determined at comparator 132. The output of the comparator would change in accordance with the position of the ROS beam as it traverses photodiode 68. Initially, one electrode would attract the majority of the carriers generated by the beam as it travels over the photodiode region lying above the first electrode, thereby driving comparator 132 to one extreme of its output range. However, as the ROS beam crosses the gap between the two electrodes, at the center of the photodiode, the output of the comparator will rapidly change state, due to the second electrode attracting the majority of the carriers, thereby driving the output of the comparator to the opposite extreme.

By monitoring the output level of comparator 132, the instant in time when the beam traverses the locus or slot along the center of the photodiode can be determined, thereby providing a signal to initiate start-of-scan. Subsequently, such a signal can be utilized to synchronize the remaining ROS beams, for example, beams 8, 10, and 12 of FIGS. 1 and 2, to facilitate the fast-scan registration of the composite image being produced on belt 14. Registration would be achieved by appropriately delaying the actual modulation of the ROS beam with image data by a time period which would be determined as a function of the time at which the start-of-scan indication is received for each of the ROS beams.

In yet another embodiment, the output signal from summing amplifier 118, shown in FIGS. 5 and 6B, may be used to provide a relative indication of the exposure intensity of each of the ROS beams. Once the intensity of ROS beams 6, 8, 10, and 12 have been calibrated to provide a desired exposure level, the output of summing amplifier 118 may be converted to a digital value via an analog-to-digital converter (not shown) and stored. The stored value could then be compared to a subsequent reading on a periodic basis, for example, every n scan lines, to determine if the exposure intensity of the ROS beam is within a predetermined range of the intensity previously set during calibration. It is important to note that while an intensity signal generated in this manner may not be suitable to provide a direct measure of the ROS beam intensity, the signal may provide sufficient resolution so as to indicate drift or sudden changes in the exposure intensity which may be used to trigger a recalibration operation within the ROS printing system.

In recapitulation, the present invention is an apparatus and method for monitoring the position and intensity of a radiant energy beam. The invention utilizes a technique for integrating the electrode currents from lateral-effect photodiodes to effectively measure the position of a beam during its transit across the surface of the photodiode, as well as, to provide a relative indication of the intensity of the beam. Utilization of the integration technique permits the use of the present invention across a wide range of ROS based printing systems as it is relatively insensitive to the pulse period of the beam. Integration also makes the measurements produced by the sensors independent of the time at which the pulse is read. Moreover, when the integrators are coupled to peak height detectors the signal can be preserved while the integrators are reset, thereby allowing subsequent interrogation by a control device.

It is, therefore, apparent that there has been provided, in accordance with the present invention, a method and apparatus for accurately and reliably determining the position of a radiant energy beam. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims

We claim:

1. An imaging apparatus for forming, during a single pass, multiple image exposure frames on a photoconductive belt moving in a process direction, including:
   a Raster Output Scanner (ROS) unit generating image-modulated scan lines that are transmitted along an optical path to an associated image exposure frame, said ROS unit comprising:
      a laser for generating a radiant energy beam;
      means for modulating the radiant energy beam of said laser in response to input video signals; and
      optical means for directing the radiant energy beam onto the associated image exposure frame of the photoreceptor to provide an optically focused scan line at the photoreceptor surface;
   a lateral-effect photodiode for sensing the position of the scan line with respect to the process direction and producing a signal as a function of the scan line position; and
   means, responsive to the signal produced by the lateral-effect photodiode, for altering the position of the radiant energy beam at the photoreceptor surface, to enable steering of the scan line in the process direction.

2. The imaging apparatus of claim 1, wherein the lateral-effect photodiode comprises a pair of electrodes spaced in opposition to one another so as to generate electrical currents therein in response to the radiant energy beam traversing an active region of the photodiode interposed between the electrodes.

3. The imaging apparatus of claim 2, further comprising:
   means for integrating the electrical signals produced by each of the electrodes during a portion of the period in which the radiant energy beam traverses the active region of the photodiode interposed between the electrodes; and
   differentiating means for determining the position of the radiant energy beam during a traversal of the beam across the active photodiode region, said position being determined as a function of the difference between the integrated electrical signals.

4. A method for steering a radiant energy beam of a raster output scanner (ROS), in an imaging system suitable for forming multiple image exposure frames on a photoconductive member moving in a process direction during a single pass, including the steps of:

(a) generating an image-modulated scan line with the ROS beam;
(b) monitoring the position of the ROS beam with a sensing apparatus employing a lateral effect photodiode having at least two opposing electrodes disposed therein;
(c) integrating the current generated by the photodiode electrodes, in response to the ROS beam, during a period in which the beam traverses the active region of the photodiode interposed between the electrodes;
(d) representing the position of the scan line as a ratio between a sum and a difference signal, said sum and difference signals being determined from the integrated electrode signals; and
(e) adjusting the transit path of the ROS beam at the photoreceptor in response to the ratio determined in step (d).

* * * * *